United States Patent
Janabi

(10) Patent No.: US 6,260,030 B1
(45) Date of Patent: Jul. 10, 2001

(54) MULTI GRADE FUZZY LOGIC CONTROLLER

(76) Inventor: Talib Janabi, 240 Bernard Avenue, Richmond Hill, Ontario (CA), L4S 1E2

(*) Notice: Subject to any disclaimer, the term of this patent is extended or adjusted under 35 U.S.C. 154(b) by 0 days.

(21) Appl. No.: 08/982,270

(22) Filed: Dec. 1, 1997

(51) Int. Cl.[7] .................................................. G06F 15/18
(52) U.S. Cl. .................................................. 706/4; 706/8
(58) Field of Search ................ 706/1, 52, 8, 4

(56) References Cited

U.S. PATENT DOCUMENTS

| | | | |
|---|---|---|---|
| 5,485,550 | * 1/1996 | Dalton | 706/52 |
| 5,495,574 | * 2/1996 | Miyazawa et al. | 706/4 |
| 5,499,319 | * 3/1996 | Janabi et al. | 706/1 |
| 5,524,179 | * 6/1996 | Kanda | 706/1 |
| 5,572,629 | * 11/1996 | Choi | 706/52 |
| 5,787,407 | * 7/1998 | Viot | 706/8 |
| 5,796,919 | * 8/1998 | Kubica | 706/1 |
| 5,799,132 | * 8/1998 | Rizzotto | 706/8 |
| 6,041,320 | * 3/2000 | Qin et al. | 706/1 |
| 6,078,911 | * 6/2000 | Bonissone et al. | 706/52 |

* cited by examiner

Primary Examiner—Mark R. Powell

(57) ABSTRACT

The present invention relates to the architecture and implementation of real-time knowledge-based fuzzy controller system for general purpose industrial applications. In another aspect the invention relates to the development of an intelligent system which implements fuzzy decision-making procedure which employs selected membership function values such that all signal values present at the input to the fuzzy controller contribute to the controller output at all times thereby simulating dynamical system behavior. In yet another aspect, the invention relates to the development of a fuzzy inference engine which implements an approximate reasoning method based on employing elected membership function values of input signals such that the number of rules which the controller fires is reduced. In this way the fuzzy controller becomes fast and requires less memory than other designs of fuzzy controllers.

3 Claims, 4 Drawing Sheets

The MG - FLC Controller Modules

The MG - FLC Controller Modules

Defuzzification for Triangular Membership Functions

Defuzzification for Trapezoidal Membership Functions

MULTI GRADE FUZZY LOGIC CONTROLLER

BACKGROUND OF THE INVENTION

Fuzzy controller designs are based on using a knowledge-base (KB) which consists of fuzzy rules and membership functions. To utilize this KB, existing designs of fuzzy controllers employ approximate reasoning mechanisms such as the Compositional Rule of Inference (CRI) which requires the formation of fuzzy matrices. The fuzzy matrices grow in complexity as the number of inputs/outputs of the controller increases, thereby requiring larger memory and more intensive computations. For all input signals of the fuzzy controller to contribute to its output, the scheme evaluates all the rules to make its decision giving rise to high computational requirements and coarser approximation. At the defuzzifier each rule is associated with one membership function (MF) value, which is identified herein as membership grade (MG). The scheme utilizes these MG's to calculate the controller output. To obtain the final output of the controller, all the possible rules are fired giving rise to many outputs, and these outputs are then averaged using special methods.

Due to the above, fuzzy controllers, even though powerful, are difficult to optimize and generally face difficulties in coping with real-time applications for fast and complex multivariable processes.

It can be seen, therefore, that using a scheme which reduces the number of rules that the fuzzy controller requires to fire, as well as employing a defuzzification method whose average is less coarse will result in a fuzzy controller with an improved response, easier to tune and requires much less memory for processing its knowledge-base.

Other relevant literature includes:
1. L. Sultan and T. H. Janabi, "Fuzzy Logic Controller", U.S. Pat. No. 5,499,319; 1996.
2. L. A. Zadeh, "Outline of a new approach to the analysis of complex systems and decision processes," IEEE Trans. Systems, Man and Cybernetics, Vol. SMC-3, pp. 28–44, 1973.
3. L. A. Zadeh, "The concept of a linguistic variable and its application to approximate reasoning, I and II", Inform. Sci., Vol. 8, pp. 199–249 and vol. 9, pp. 301–357, 1975.
4. L. A. Zadeh, "Fuzzy Logic", IEEE Computer Magazine, pp. 83–93, Apr. 1988.
5. L. A. Zadeh, "Knowledge Representation in Fuzzy Logic", IEEE Transaction on Knowledge and Data Engineering, Vol. 1, No. 1, pp. 89–100, March 1989.
6. E. H. Mamdani, "Application of Fuzzy Logic to Approximate Reasoning Using Linguistic Synthesis", IEEE Transaction on Computer, Vol. C-26, No. 12, pp. 1182–1191, December 1977.

SUMMARY OF THE INVENTION

This invention is a fuzzy logic controller based on the premise that at any given time all the input signal values to a controller must directly contribute to its output, each with an amount of influence on the output proportional to its level of strength. These strength levels can be described by certainty levels, with the highest certainty being 100% (or 1 on a scale of 0 to 1). It follows that each such input signal value must contribute to the fuzzy controller output with an amount proportional to its certainty level. This scheme is in agreement with the human operator decision which is based on the process situation which is, in turn, manifested in all the signal values received from the process. Furthermore, the scheme is also in agreement with the phenomena observed in dynamical systems that all the values of all the inputs to the system contribute to its output. In this way the fuzzy controller need only to fire a limited number of rules to achieve its task.

To accomplish the foregoing and other objects, and in accordance with the present invention as described and embodied herein, a system called the Multi Grade Fuzzy Logic Controller (MG-FLC) is presented embodying the organization, as well as, the scheme of implementation of a fuzzy logic controller system. In this system the measured process values are received as crisp data input and according to which control actions are generated in the form of crisp data output as control signals.

The following are the main aspects of the MG-FLC:
1. It is a controller for general purpose applications capable of solving linear and nonlinear control problems.
2. The controller can fire as few, or as many, fuzzy rules as desired, hence it can be configured to have fast real-time response.
3. There is reduced memory requirement.
4. The controller can solve complex and multivariable control applications.

In a preferred aspect, the present invention is directed to an apparatus for fuzzy logic inference engine comprising:
 a) means for determining input membership function values by receiving signals of said input and determining the membership function value for every said input signal, such said input membership function values corresponding to an IF part of at least one inference rule;
 b) means for determining an inference quantity corresponding to a THEN part of at least one inference rule, such said inference rule corresponding to said input membership function values;
 c) means for determining an output signal by receiving all said determined input membership function values and every said inference quantity corresponding to a said THEN part of said inference rule corresponding to each said input membership function value; and
 d) means for multiplying, adding, dividing and averaging to determine the said output signal values.

Other aspects and advantages of the invention will be apparent from the forthcoming description of the invention.

BRIEF DESCRIPTION OF DRAWINGS

Preferred embodiments of the present invention are illustrated in the attached drawings in which.

DETAILED DESCRIPTION OF THE INVENTION

Figure 1:
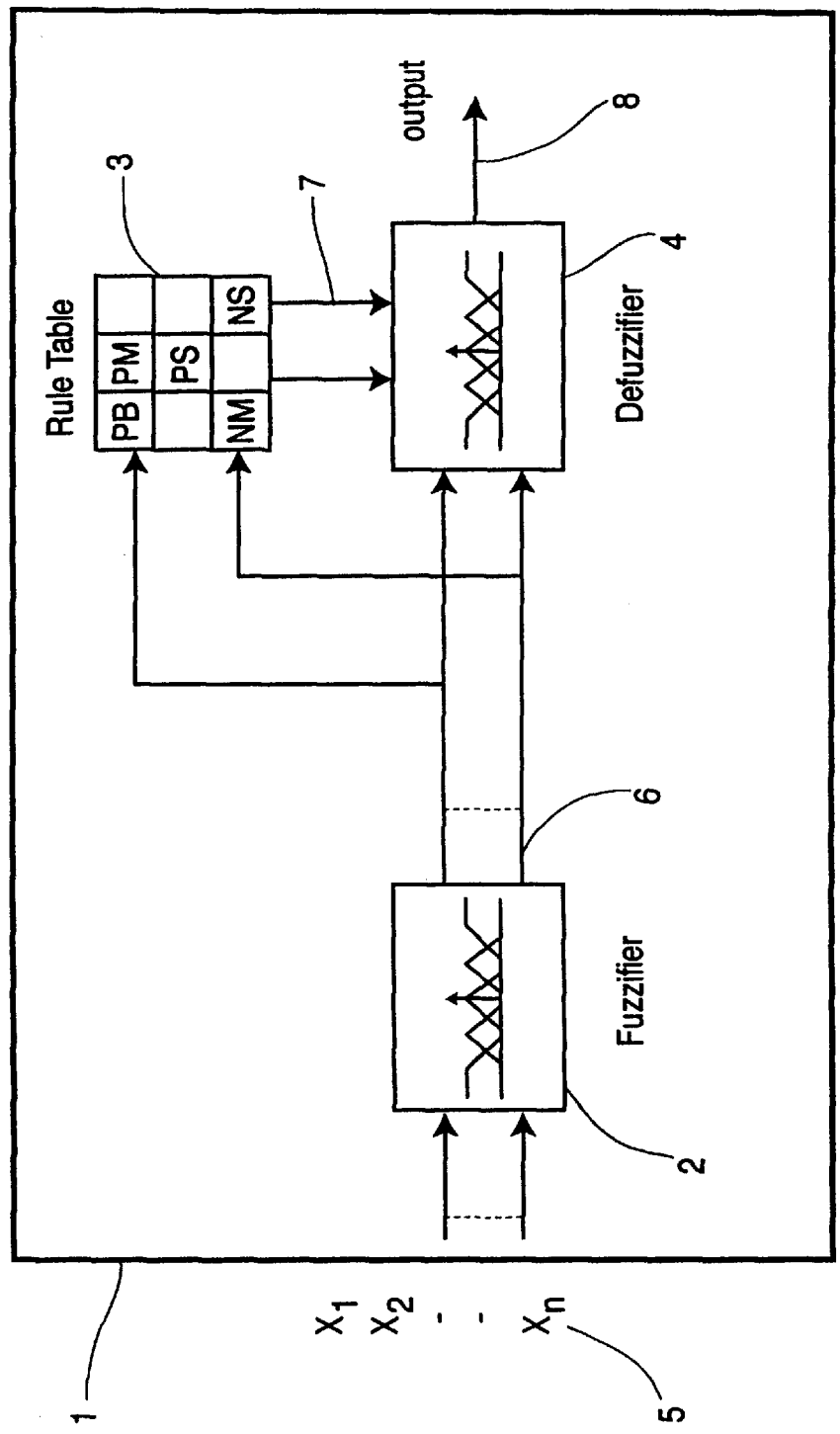
FIG. 1 is a diagram illustrating the preferred organization and block modules of the Multi Grade Fuzzy Logic Controller system used for the embodiment of the invention.

This invention is based on the following premises:
1. All input signal values provided to the fuzzy controller must directly contribute to the controller output at any given moment in time through the fuzzy rules and their membership functions.

2. Each input signal value contributes to the fuzzy controller output with an amount proportional to its certainty level (membership function value), with the largest certainty being 100% (or 1).

These premises are illustrated in the following example, wherein:

P is a fuzzy predicate (such as: Temperature is High),
Q is a fuzzy predicate (such as: Fan speed is Moderate)
In the statement:

$$\text{IF P THEN Q} \qquad (1)$$

P represents the antecedent (situation) and Q represents the consequent (conclusion). It is well known that if Q is caused by P, then its certainty level is less than or equal to that of P. As such, if P is happening with some certainty $S_P$ and it is known that P will cause Q to happen, then the certainty that Q itself will happen is less than or equal to the certainty that P has happened. As such, if $S_Q$ is the certainty level of Q, then $S_Q$ will be less than or equal to $S_P$.

The above can be expressed in fuzzy terms. For example, in the statement

IF Fast THEN Brake,

Fast represents the situation and Brake represents the conclusion (or action). This statement instructs what action to perform at some situation (Fast).

In a situation such as Rather Fast, fuzzy logic provides a facility to consider this new situation. The facility is an extension of the Modus Ponens rule of logical inference. For this situation, Rather Fast means Fast has a degree of certainty less than Fast.

Applying this fuzzy logic, the following inference is generated:

$$\begin{array}{c} \text{Clause 1: IF Fast THEN Brake} \\ \text{Clause 2: Rather Fast} \\ \underline{\text{(which is fast with some degree less than full Fast)}} \\ \text{Conclude: Rather Brake} \\ \text{(which is brake with some degree less than full Brake)} \end{array} \qquad (2)$$

To calculate the degree of Rather Brake, the CRI method (of L. A. Zadeh) is applied. It solves this problem by applying set theory, developing fuzzy set theory. The conclusion is that the degree of Rather Brake is a minimum of some other degrees.

The calculation is as follows:

If Fast is a member of a universe of discourse $U_1$ and Brake is a member of a universe of discourse $U_2$, then:

1. Calculate the degree of certainty of Fast x Brake. The degrees of Fast and Brake are taken in relation with their universes of discourse. The result is a matrix called the fuzzy relation matrix.

2. Calculate the degree of Rather Brake by composing the degree of Rather Fast with the relation matrix. Using the so-called Max-Min principle, the composition is built by taking some minimum values then taking the maximum values among these minimum values from the relation matrix.

These degrees are membership function values. However, since the CRI method considers a minimum, the degree of Rather Brake will be less than or equal to the degree of Rather Fast. This conclusion agrees with the original proposition.

Applying this concept to fuzzy controllers where several input variables must be treated, the following must be done: a fuzzy relation must be generated for every input; a certainty degree (membership function value) of the output (consequent) must be calculated for every input in the above manner of Max-Min; finally the final certainty degree must be adjusted using all these degrees. This implies firing many rules (generally all possible rules) of the equation related to producing the conclusion Rather Brake, described earlier.

A Rule-based implementation, instead of fuzzy relations matrices, is used to simplify the implementation of the Max-Min principle in fuzzy controllers. This is performed as follows:

Every input variable generates a membership grade (MG), by comparing it with its own membership functions and universe of discourse. Many rules are generated from this. For every rule, the minimum MG of all grades from all inputs is selected to represent that rule and to be associated with it. The rule, together with this minimum MG, are then used to generate outputs. All outputs which are generated by all the rules are averaged using defuzzification methods to generate the final output of the fuzzy controller.

In this invention, instead of associating one membership grade (the minimum) with every rule, a rule is associated with as many membership grades as there are inputs, and each membership grade is generated by one input in association with the fuzzy set in the rule's antecedent. This amounts to firing the same rule as many times as the number of inputs.

The computational requirement for searching for the rules is not increased since a rule is searched for once then used several times. The advantage is that several outputs for every rule are computed. It follows that all the rules do not have to be fired to obtain the output, thereby reducing the computational resources normally needed to search for all the rules. In the invention the influence of every input to the fuzzy controller generates an output employing the same fired rule. This is in complete agreement with what happens in dynamic systems where at any given time the value of every input signal to a system has its own contribution to the output of the system. The output signal of the system being the combination of all the contributions of all input signals.

This method guarantees that the values of all the input signals to the fuzzy controller will directly contribute to its output, and in the relevant proportions, using minimum number of rules (only one or two rules are sufficient), while for other fuzzy controller designs to provide such a guarantee they need to fire all the rules, and even then they may not be able to give such guarantee unless some restrictions are placed on the points of intersections of every adjacent membership functions.

This invention provides a fuzzy logic controller that does not have to fire too many fuzzy rules to make its decision; instead firing a small number of rules is sufficient.

To adhere to the Max-Min principle in fuzzy controller design, two rules are employed. One of these rules is associated with the minimum membership grades of the input signals, satisfying the Min principle. The other rule is associated with the next higher membership grades of the same input signals, satisfying the Max principle.

Also, the decision will be influenced by all inputs of the fuzzy controller without using other combinations of MF grades of these input signals since further combinations will generate further rules.

Furthermore, every rule will generate several defuzzifier outputs whereby each output is associated with one MF grade. The final output is an average of all the defuzzifier outputs. Note that in other fuzzy controller design methods every rule fires one defuzzifier output, necessitating the firing of many rules to obtain the required average of the fuzzy controller output. In the present invention, all input signal values contribute to the fuzzy controller output all the time. In other fuzzy controller designs one input may influence the controller output more than another input because it solely contributes to the output via applying the Max-Min principle. For example, this would happen if its membership function value happens to be the minimum all the time.

Note, also, that if an input has the minimum membership function values) and contains noise in the data, the impact of noise on the control system can be devastating. Therefore, one of the advantages of the design of this invention is that it is more immune to the effects of noise and sudden disturbances. Generally a disturbance occurs in one of the inputs while the other inputs maintain their influence on the controller decision. The invention provides an approximate reasoning mechanism which is simple and fuzzy controller response which is fast and reliable.

DETAILED DESCRIPTION OF THE PREFERRED EMBODIMENT OF THE INVENTION

This invention satisfies the following objectives:
1. The fuzzy logic controller utilizes all input signal values for decision making and for generating its output. Every input value contributes all the time through the fuzzy rules and membership functions of the fuzzy controller.
2. The fuzzy logic controller only has to fire a few (maximum of two) rules only for every set of input signal values to perform its task.

The rationale of the first objective is that the decision of the human operator is influenced by all given conditions of the process situation. Since, the fuzzy logic controller of this invention simulates this decision process, it must also consider all input signals (representing all conditions of the process situation) in making its decision. Furthermore, this mimics dynamic systems where all input signals contribute directly to the output at all times.

The rational behind the second objective is that the FLC does not need to fire more than two rules to achieve the first objective and simultaneously providing a very fast controller response. Firing too many rules requires more computations and causes unnecessary degradation of the controller response. The fuzzy controller reasoning mechanism of this invention provides more efficient use of the membership function values of the input signals. Firing too many rules will be unnecessary (even though it is possible).

Using the input signals and their membership function values as in this invention replaces the need for firing too many rules and produces the controller output signal more efficiently. This enhancement is achieved through input signal mapping via the fuzzy controller signal transformation mechanism whereby each input signal value produces an output signal value.

The mapping can be seen as follows. Let I be an input signal to the fuzzy controller and O be an output signal O. As such, $$O = G \times I \quad (3)$$

Where G is a nonlinear gain obtained via the fuzzification-defuzzification operations employing the membership functions of the controller input and output variables. The above equation clearly shows that every input signal value contributes directly to the output via the nonlinear mapping of the fuzzy controller.

The MG-FLC of the preferred embodiment of this invention utilizes all input signals and fires two rules to generate the output signal, though the invention provides firing as many rules as required.

Referring to FIG. 1, the MG-FLC 1 has three modules: a Fuzzifier Module 2, Rule-Selector Module 3 and Defuzzifier Module 4.

The MG-FLC operates as follows. MG-FLC 1 receives the input signals 5 of the process being controlled. These signals are channeled to Fuzzifier 2. Any fuzzification method may be used. Of the MF values which can be generated for a given input signal from all the MF's belonging to the patterns of the concerned variable, the Fuzzifier generates only two membership function (MF) values for each signal from two adjacent membership functions. One of these values is the lowest value and the second value is the next higher value. The rationale behind this selection is the Max-Min principle employed in the CRI scheme. The Fuzzifier output 6 is channeled to the Rule Selector 3 and Defuzzifier 4. The Rule Selector identifies two rules to be fired. One rule is associated with the smallest value of the MF's and one rule is associated with the second smallest value. These rules are channeled to the Defuzzifier 4 through signals 7. The Defuzzifier calculates the output signal value 8. The output is the average of all the output signals generated by every MF value received by the Defuzzifier. The Defuzzifier output 8 is the final output signal of the MG-FLC 1.

Figure 2:
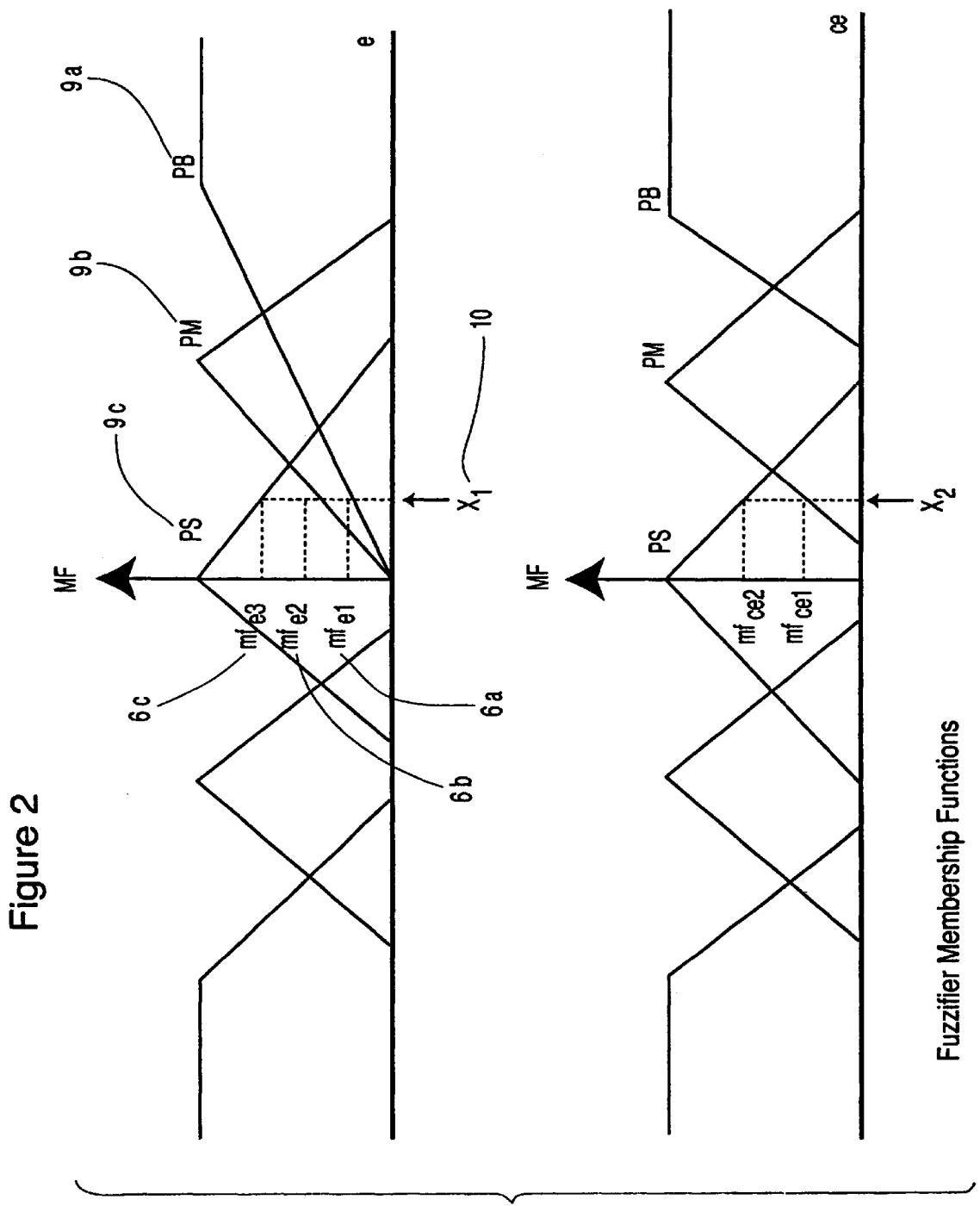
FIG. 2 is a diagram illustrating the preferred implementation of the Fuzzifier action of the invention.

FIG. 2 provides details of the operation of the MG-FLC 1. Each of input of the MG-FLC has a universe of discourse describing the range of its values. The y-axis represents the universe of discourses of the MF values for each input. The MF may be a straight line, trapezoidal, a curve, or any other function.

The Fuzzifier receives all the input signals ($x_1, x_2, \ldots, x_n$), then generates MF values for each ($MF_{11}, MF_{12}, \ldots, MF_{21}, MF22, \ldots MF_{nm}$) employing an available fuzzification method. After that, the two smallest generated MF values are selected for all input signals.

FIG. 2 illustrates an example. PB at 9a, PM at 9b and PS at 9c are membership functions. The measured value $x_1$ at 10 of the error e generates three MF values $mf_{e1}$ at 6a, $mf_{e2}$ at 6b and $mf_{e3}$ at 6c. Likewise, MF values $mf_{ce1}$ and $mf_{ce2}$ for the change of error ce are generated from the PM and PS MFs.

In this example there are six combinations for the MF values. However, the only two lowest values, $mf_{e1}$ and $mf_{ce1}$, are selected as the first combination for one fuzzy rule.

The two next higher values, $mf_{e2}$ and $mf_{ce2}$, are selected for the second rule. These two rules are:

IF e is PB AND ce is PM THEN . . .

IF e is PM AND ce is PS THEN . . .

Next, Rule Selector 3 fires two fuzzy rules. Here, the premises of the rules are (PB, PM) and (PM, PS). Rule Selector 3 then generates the output fuzzy categories of the fired rules (consequence). These are channeled to Defuzzifier 4. Let these consequences, for example, be PM and PS successively.

Next, defuzzifier 4 generates a crisp output signal 8 using one of the following methods:
1. An available defuzzification method (such as the center of sums, the height defuzzification etc.) using the selected MF values; or
2. Using only the vertices and points of intersections of membership functions with the x-axis are utilized. This is a fast mechanism.

Figure 3:
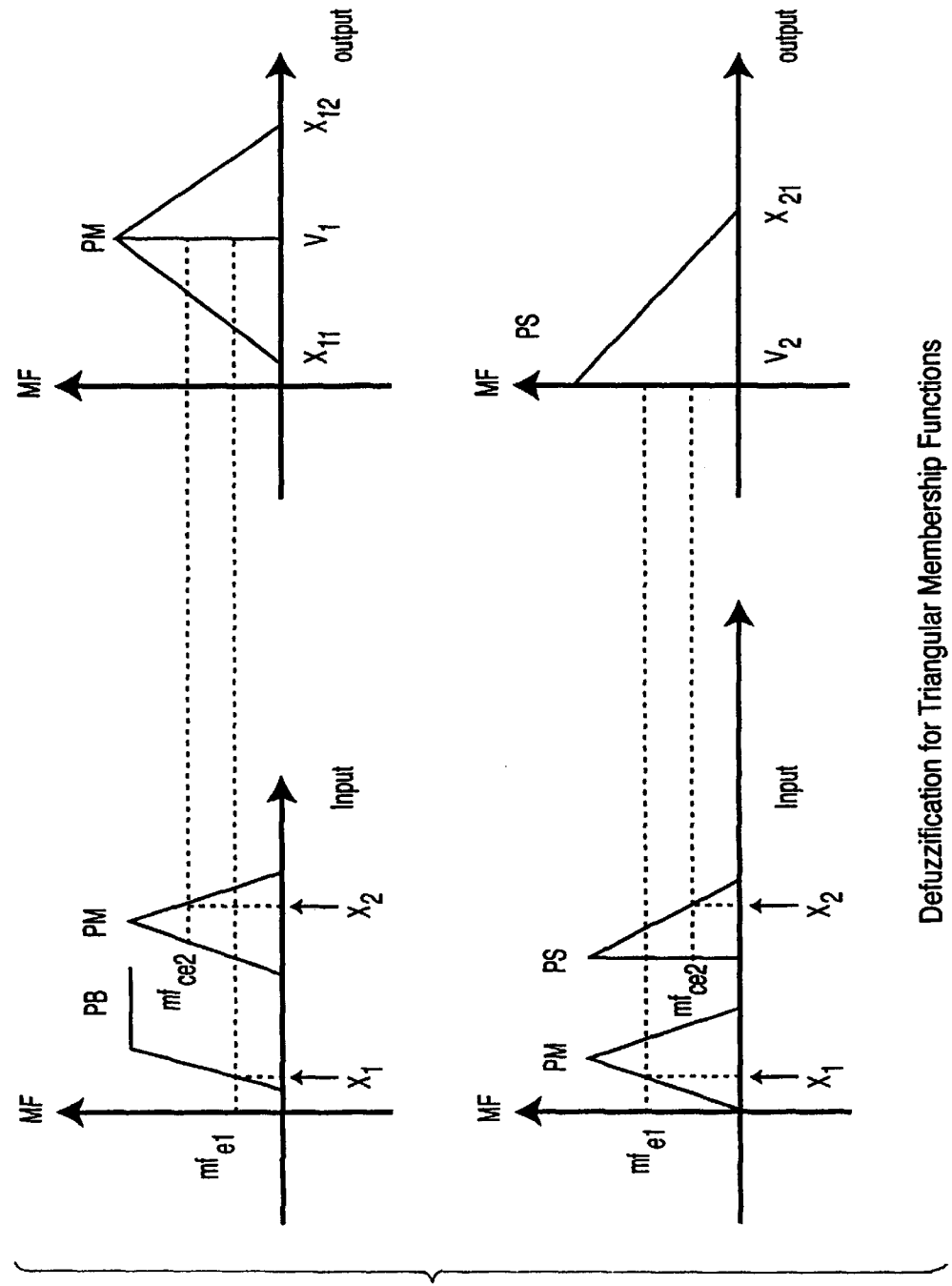
FIG. 3 is a diagram illustrating the preferred implementation of the Defuzzifier action of the invention for triangular functions.

Referring to FIG. 3, to generate a crisp output value for every fired rule and every MF having a triangular output, the following equation is used:

$$o_{ij}=V_i \times mf_{ij}+([x_{i1}+x_{i2}]/2)(1-mf_{ij}) \quad (4)$$

where:

$V_i$=x-value of the vertex point of the membership function triangle.

$x_{ij}$=x-values of the intersection points of the membership function triangle with the x-axis.

$mf_{ij}$=selected values of the input membership function which are generated by the fuzzifier $o_{ij}$=output generated by the defuzzifier for every selected membership function generated by the fuzzifier.

Figure 4:
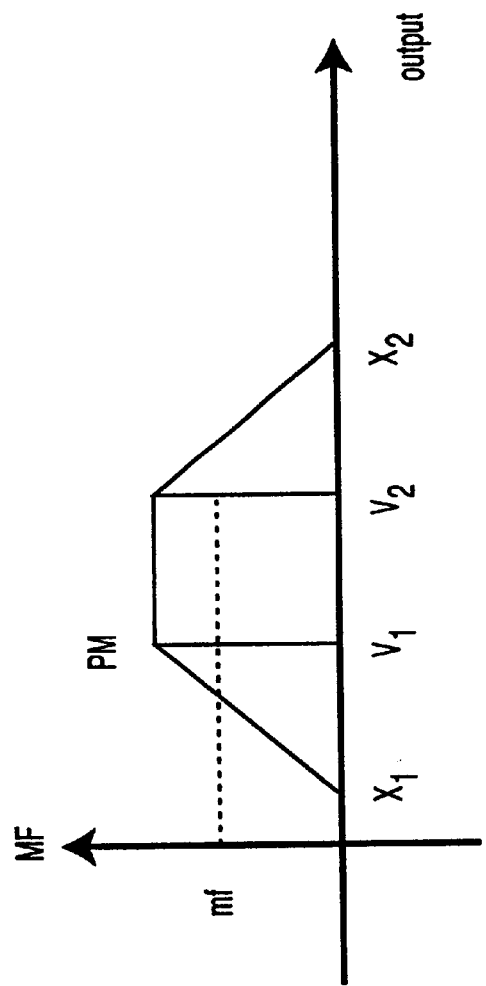
FIG. 4 is a diagram illustrating the preferred implementation of the Defuzzifier action of the invention for trapezoidal membership functions.

Referring to FIG. 4, to generate a crisp output value for very fired rule and every MF having a trapezoidal output, the following equation is used:

$$o_{ij}=([V_{i1}+V_{i2}]/2) \times mf_{ij}+([x_{i1}+x_{i2}]/2)(1-mf_{ij}) \quad (5)$$

where:

$V_{i1}$=x-value of the first vertex point of the membership function trapezoid.

$V_{i2}$=x-value of the second vertex point of the membership function trapezoid.

Using the values of the vertices and the points of intersection of the membership function with the x-axis provides the following advantages:
1. More versatility and more degrees of freedom in optimizing the knowledge-base.
2. Only the values of the vertices and the intersection points of the membership functions with the x-axis need to be stored, thereby conserving memory.
3. Defuzzification is fast and requires minimal computational resources.

The Defuzzifier output 8 is then calculated as follows:

$$D = \sum_i^n \sum_j^m (MF_{ij} \times o_{ij}) / \sum_i^n \sum_j^m (MF_{ij}) \quad (6)$$

where:

$MF_{ij}$=all the input MF values (such as $mf_{e1}$, $mf_{e1}$, $Mf_{e2}$ and $mf_{ce2}$ in the previous example) generated by the Fuzzifier and associated with both rules.

$o_{ij}$=all the output values generated by the Defuzzifier.

I claim:

1. A fuzzy logic inference engine apparatus comprising:
(a) means for determining input membership function values by receiving signals of said input and determining the membership function value for every said input signal, such said input membership function values corresponding to an IF part of at least one inference rule;
(b) means for determining an inference quantity corresponding to a THEN part of at least one inference rule, such said inference rule corresponding to said input membership function values;
(c) means for determining an output signal by receiving all said determined input membership function values and every said inference quantity corresponding to a said THEN part of said inference rule corresponding to each said input membership function value;
(d) means for multiplying adding dividing and averaging to determine the said output signal values;
and in which (e) two fuzzy rules are selected for firing to obtain the final output of the fuzzy controller on the followin basis;
(f) the first fuzzy rule is selected for firing on the basis of selecting the lowest values of input membership functions as the first combination for said first fuzzy rule, and the second fuzzy rule is selected for firing on the basis of selecting the next higher values of input membership functions as the second combination for said second fuzzy rule;
(g) every said selected fuzzy rule for firing is fired as many times as there are input variables to the fuzzy controller;
(h) every time said selected rule for firing is fired it is associated with one said input membership function value belonging to one said input variable; and
(i) every time said selected fuzzy rule for firing is fired it generates an output signal which contributes to the final output of the controller.

2. A fuzzy logic inference engine apparatus according to claim 1 in which:
a) every said input membership function value of every said input signal is utilized with every said inference quantity corresponding to a said THEN part of said inference rule to generate an output value which contributes to produce the overall output signal of the fuzzy controller; and
b) all said signals of input to the fuzzy controller contribute to the said overall output signal of the fuzzy controller proportionately according to their weights of said input membership function values.

3. A fuzzy logic inference engine apparatus according to claim 1 in which:
said means for determining output signal values uses any or all of the following equations:

$$o_{ij}=V_i \times mf_{ij}+([x_{i1}+x_{i2}]/2)(1-mf_{ij}) \quad (4)$$

where:

$V_i$=x-value of the vertex point of the membership function triangle.

$x_{ij}$=x-values of the intersection points of the membership function triangle with the x-axis.

$mf_{ij}$=selected values of the input membership function which are generated by the fuzzifier $o_{ij}$=output generated by the defuzzifier for every selected membership function generated by the fuzzifier.

$$o_{ij}=([V_{i1}+V_{i2}]/2) \times mf_{ij}+([x_{i1}+X_{i2}]/2)(1-mf_{ij}) \quad (5)$$

where:

$V_{i1}$=x-value of the first vertex point of the membership function trapezoid.

$V_{i2}$=x-value of the second vertex point of the membership function trapezoid.

$$D = \sum_i^n \sum_j^m (MF_{ij} \times o_{ij}) / \sum_i^n \sum_j^m (MF_{ij}) \quad (6)$$

where:

$MF_{ij}$=all the input MF values (such as $mf_{e1}$, $mf_{e1}$, $mf_{e2}$ and $mf_{ce2}$ in the previous example) generated by the Fuzzifier and associated with both rules.

$o_{ij}$=all the output values generated by the Defuzzifier.

* * * * *